(12) United States Patent
Lu et al.

(10) Patent No.: US 12,106,606 B2
(45) Date of Patent: Oct. 1, 2024

(54) METHOD FOR DETERMINING THE DIRECTION OF GAZE BASED ON ADVERSARIAL OPTIMIZATION

(71) Applicant: Beihang University, Beijing (CN)

(72) Inventors: Feng Lu, Beijing (CN); Yihua Cheng, Beijing (CN)

(73) Assignee: Beihang University, Beijing (CN)

( * ) Notice: Subject to any disclaimer, the term of this patent is extended or adjusted under 35 U.S.C. 154(b) by 370 days.

(21) Appl. No.: 17/561,857

(22) Filed: Dec. 24, 2021

(65) Prior Publication Data
US 2022/0222969 A1 Jul. 14, 2022

(30) Foreign Application Priority Data
Jan. 13, 2021 (CN) .................... 2021100753561.1

(51) Int. Cl.
*G06V 40/18* (2022.01)
*G06T 7/73* (2017.01)
*G06V 10/48* (2022.01)
*G06V 10/94* (2022.01)
*G06V 40/16* (2022.01)

(52) U.S. Cl.
CPC .............. *G06V 40/193* (2022.01); *G06T 7/73* (2017.01); *G06V 10/48* (2022.01); *G06V 10/95* (2022.01); *G06V 40/171* (2022.01); *G06T 2207/30201* (2013.01)

(58) Field of Classification Search
CPC ...... G06V 40/193; G06V 10/48; G06V 10/95; G06V 40/171; G06V 10/82; G06V 40/18; G06V 40/161; G06V 40/168; G06T 7/73; G06T 2207/30201; G06N 3/08
See application file for complete search history.

(56) References Cited

U.S. PATENT DOCUMENTS

| | | | |
|---|---|---|---|
| 2020/0202561 A1* | 6/2020 | Liu | G06T 7/73 |
| 2020/0302640 A1* | 9/2020 | De Villers-Sidani | G06V 40/171 |
| 2021/0181837 A1* | 6/2021 | Jiang | G06F 3/011 |
| 2021/0183072 A1* | 6/2021 | Puri | G06N 3/08 |
| 2021/0192693 A1* | 6/2021 | Jepson | G06N 20/20 |
| 2021/0248714 A1* | 8/2021 | Isikdogan | G06V 40/193 |
| 2021/0256353 A1* | 8/2021 | Nilsson | G06N 3/047 |

FOREIGN PATENT DOCUMENTS

WO WO-2021135827 A1 * 7/2021 ......... G06K 9/00281

* cited by examiner

*Primary Examiner* — Ping Y Hsieh
*Assistant Examiner* — Vaisali Rao Koppolu

(57) ABSTRACT

The embodiments of the present disclosure disclose a method for determining the direction of gaze. A specific implementation of the method includes: obtaining a face or eye image of a target subject, and establishing a feature extraction network; using an adversarial training method to optimize the feature extraction network, and implicitly removing the gaze-irrelevant features extracted by the feature extraction network, so that the feature extraction network extracts gaze-related features from the face or eye image to obtain the gaze-related features; determining the target gaze direction based on the gaze-related features. This implementation can separate the gaze-irrelevant features contained in the image features from the gaze-related features, so that the image features contain the gaze-related features, and that the accuracy and stability of the determined direction of gaze are further improved.

5 Claims, 3 Drawing Sheets

METHOD FOR DETERMINING THE DIRECTION OF GAZE BASED ON ADVERSARIAL OPTIMIZATION

CROSS-REFERENCE TO RELATED APPLICATIONS

The present application is based on, and claims priority from, Chinese application number CN202110075356.1, filed Jan. 13, 2021, the disclosure of which is hereby incorporated by reference herein in its entirety.

TECHNICAL FIELD

The embodiments of the present disclosure relate to the field of image processing technology, and in particular, to a method for determining the direction of gaze.

BACKGROUND

At present, gaze tracking is an important field in computer vision. The main purpose of gaze tracking is to predict the user's gaze direction. The user's gaze direction contains a large amount of the user's personal preference information and personal perception information. Gaze tracking technology plays an important role in human-computer interaction and user's intention understanding.

SUMMARY

The content of the present disclosure is to introduce concepts in a brief form, and these concepts will be described in detail in the following section of the detailed description. The content of the present disclosure is not intended to identify the key features or essential features of the claimed technical solution, nor is it intended to limit the scope of the claimed technical solution.

Some embodiments of the present disclosure propose a method for determining the direction of gaze to solve one or more of the technical problems mentioned in the background section above.

The present disclosure provides a method for determining the direction of gaze. The goal is to optimize the image features extracted from the face or eye appearance of a target subject, remove the features irrelevant to the gaze, such as lighting and personal appearance, retain only the features related to the gaze, and predict the direction of the target gaze of the target subject by the above gaze-related features.

Specifically, the method for determining the direction of gaze provided by the present disclosure includes: acquiring a face or eye image of a target subject, establishing a feature extraction network, wherein the feature extraction network is used to extract the image features of the above target subject in the aforementioned face or eye image; using an adversarial training method to optimize the feature extraction network, implicitly removing the gaze-irrelevant features extracted by the feature extraction network, so that the feature extraction network extracts gaze-related features from the face or eye image to obtain the gaze-related features; based on the above gaze-related features, determining the direction of the target gaze.

In a possible implementation, the above adversarial task includes:

Establishing an image reconstruction network, inputting image features to the image reconstruction network, the image reconstruction network outputting the generated images. In the network training process, the image reconstruction network attempts to recover the face or eye image of the target subject from the above image features. The feature extraction network optimizes and adjusts its own parameters to reduce the image information contained in the extracted image features, so that the image reconstruction network cannot recover the face or eye image of the target subject from the above image features. At the same time, by setting up a weight map for the face or eye image of the target subject, and weighting the different areas in the image, the task is refined to reduce the image information contained in a certain area in the image, such as the eye area, thereby eliminating the gaze-irrelevant features in the designated area.

On the other hand, a gaze prediction network is established, image features are input into the gaze prediction network, and the gaze prediction network outputs the gaze direction. In the network training process, both the gaze prediction network and the above feature extraction network try their best to ensure the accuracy of the gaze direction determination, requiring the image features extracted by the feature extraction network to contain gaze information that has a number greater than or outnumbers a first predetermined threshold. This also means to maximize the image information contained in the image features.

Compared with the prior art, the present disclosure has the advantages that: the present disclosure optimizes the extracted image features by designing an adversarial task, implicitly removes the gaze-irrelevant features contained in the extracted image features, and retains only the gaze-related features. Most of the current gaze prediction methods automatically learn features for gaze estimation from images through neural networks. However, for an image of the face, some gaze-irrelevant features (for example, lighting) will be closely combined with the gaze-related features (for example, facial feature points), i.e., the extracted features may be facial feature points that contain lighting. By establishing two adversarial tasks, the present disclosure sets a constraint that the extracted image features contain image information whose number is less than a predetermined threshold, and gaze information whose number is greater than a first predetermined threshold. By way of adversarial training, the gaze-irrelevant features contained in the image features are separated from the gaze-related features, so that the image features contain the gaze-related features, and that the accuracy and stability of the determined direction of gaze are further improved.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Figure 1:
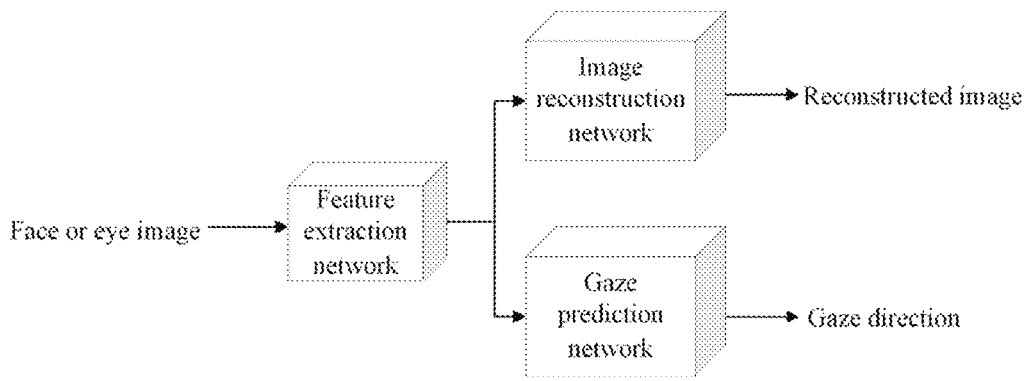
FIG. 1 is a schematic diagram of a process of the method for determining the direction of gaze according to some embodiments of the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

Besides, it should be noted that, for ease of description, only the portions related to the relevant invention are shown in the drawings. In the case of no conflict, the embodiments in the present disclosure and the features in the embodiments can be combined with each other.

It should be noted that such adjuncts as "one" and "more" mentioned in the present disclosure are illustrative, not restrictive, and those skilled in the art should understand that, unless the context clearly indicates otherwise, they should be understood as "one or more".

Gaze tracking is an important field in computer vision. The purpose of gaze tracking is to predict the direction of gaze of a target user based on the target user's face appearance image. Current appearance-based gaze tracking methods usually use a deep learning model gaze, and by inputting an eye image, or a face image with more information, design a loss function, and calculate the loss caused by each target sample; and by automatically optimizing the deep learning model, learn the features suitable for gaze tracking.

The acquired face or eye image of the target subject contains a lot of information, including gaze-irrelevant information, for example, lighting. The same face or eye will have different appearances under different lightings, but they all have the same direction of gaze, and gaze-related information, for example, the direction of the pupil. According to people's intuition, the direction of gaze can be easily judged from the direction of the pupil. However, these gaze-irrelevant features and gaze-related features are often deeply combined. The current neural network model automatically learns the features suitable for gaze tracking, and these learned features may contain many gaze-irrelevant features.

Based on the above problem, the present disclosure provides a method for determining the direction of gaze. The method extracts the image features of a target subject from the face or eye image appearance through a feature extraction network. Then, two adversarial tasks are designed. The two adversarial tasks are to maximize the gaze information contained in the extracted image features and minimize the image information contained in the extracted image features respectively, thereby removing the gaze-irrelevant features hidden in the image features, and obtaining the gaze-related features. By means of the obtained gaze-related features, the direction of gaze can be predicted more accurately, and at the same time, the robustness of the method is further enhanced.

Hereinafter, the present disclosure will be described in detail with reference to the drawings and in conjunction with the embodiments.

FIG. 1 is a schematic diagram of a process of the method for determining the direction of gaze according to some embodiments of the present disclosure.

FIG. 1 shows a schematic diagram of a process of the method for determining the direction of gaze. The method for determining the direction of gaze establishes three networks, namely a feature extraction network, an image reconstruction network, and a gaze prediction network. For the collected face or eye image of the target subject, first input the acquired face or eye image of the subject into the feature extraction network to obtain image features, then input the above image features into the image reconstruction network and the gaze prediction network respectively. The image reconstruction network tries to reconstruct the face or eye image of the target subject from the image features; the gaze prediction network tries to predict the direction of gaze from the image features; while the feature extraction network tries to extract the features that cannot allow the image reconstruction network to reconstruct images and the features that can help the gaze prediction network to correctly predict the direction of gaze. Correct prediction means that the accuracy of the prediction reaches 90%.

Figure 2:
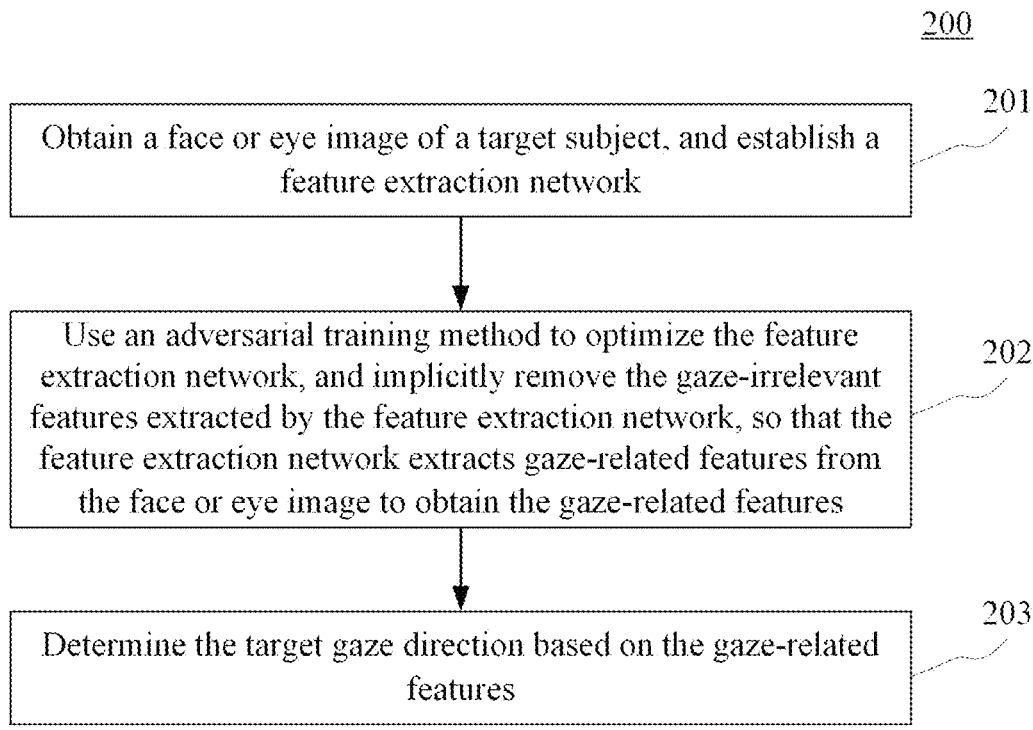
FIG. 2 is a flowchart of some embodiments of the method for determining the direction of gaze according to the present disclosure.

Continuing to refer to FIG. 2, which illustrates a process 200 of some embodiments of the method for determining the direction of gaze according to the present disclosure. The method for determining the direction of gaze includes the following steps:

Step 201: Obtain a face or eye image of a target subject, and establish a feature extraction network.

In some embodiments, the executive body of the method for determining the direction of gaze may obtain the face or eye image of the target subject, and establish a feature extraction network. Wherein, the feature extraction network is used to extract the image features of the target subject from the above face or eye image. The method provided by the present invention does not limit the acquired image to be the face or eye image of the target subject. In the following description of the embodiments, including the drawings, a face or eye image is used as an example for description. The feature extraction network may be a network that uses CNN (Convolutional Neural Networks) to extract image features from a face or eye image.

Figure 3:
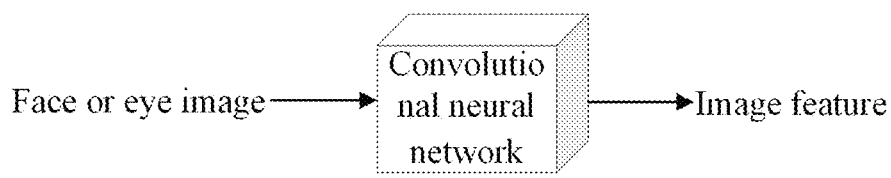
FIG. 3 is a schematic diagram of a process of the feature extraction network according to some embodiments of the present disclosure.

The process diagram of the feature extraction network is shown in FIG. 3. For the feature extraction network, it tries to prevent the image reconstruction network from reconstructing the face or eye image of the target subject, and at the same time helps the accuracy of the gaze direction of the target subject determined by the gaze prediction network to reach a second predetermined threshold. The predetermined threshold may be 90%. Its loss function is defined as:

$$\mathcal{L}_{feature} = \alpha \times (1 - \mathcal{L}_{rec}) + \beta \times \mathcal{L}_{gaze}.$$

Wherein, $\mathcal{L}_{feature}$ represents the loss function of the feature extraction network. $\alpha$ represents the first hyperparameter. $\mathcal{L}_{rec}$ represents the loss function of the image reconstruction network. $\beta$ represents the second hyperparameter. $\mathcal{L}_{gaze}$ represents the loss function of the gaze prediction network. $\alpha$ and $\beta$ can be set freely. In this embodiment, both are set to 1.

Step 202: Use an adversarial training method to optimize the feature extraction network, and implicitly remove the gaze-irrelevant features extracted by the feature extraction network, so that the feature extraction network extracts gaze-related features from the aforementioned face or eye image to obtain the gaze-related features.

In some embodiments, the above executive body may use the adversarial training method to optimize the feature extraction network, and implicitly remove the gaze-irrelevant features extracted by the feature extraction network, so that the feature extraction network extracts gaze-related features from the aforementioned face or eye image features to obtain the gaze-related features. Wherein, the adversarial training method can be a method of optimizing two adversarial networks at the same time. One of the two adversarial networks may be a network that can maximize the gaze information contained in the extracted image features. The other may be a network that can minimize the image information contained in the extracted image features. The gaze-irrelevant features may refer to features whose correlation with the gaze is less than a predetermined threshold. The gaze-related features may refer to features whose correlation with the gaze is greater than or equal to a predetermined threshold. The predetermined threshold may be 50%.

In certain optional implementations of some embodiments, the above executive body uses the adversarial training method to optimize the feature extraction network, and implicitly removes the gaze-irrelevant features extracted by the feature extraction network, so that the feature extraction network extracts gaze-related features from the aforementioned face or eye image features to obtain the gaze-related features, which may include the following steps:

In the first step, establish two auxiliary network structures to obtain a first auxiliary network (also known as the gaze prediction network) and a second auxiliary network (also known as the image reconstruction network). Wherein, the first auxiliary network may be an auxiliary network that uses CNN (Convolutional Neural Networks) to predict the direction of gaze from image features. The second auxiliary network may be an auxiliary network that uses DCNN (De-Convolution Neural Networks) to de-convolve image features into an image. It should be noted that, in general, this CNN will be composed of a convolutional layer and a fully connected layer.

As an example, after inputting the image features into the first auxiliary network, a two-dimensional gaze direction vector is output, and the two dimensions represent the yaw angle and the top-view angle of the gaze respectively.

In the second step, use the first auxiliary network and the second auxiliary network to perform two adversarial tasks respectively, wherein the first auxiliary network maximizes the gaze information contained in the image features extracted by the above feature extraction network from the face or eye image of the target subject, and the second auxiliary network minimizes the image information contained in the image features extracted by the above feature extraction network from the face or eye image of the target subject.

In the third step, by optimizing the two auxiliary network structures at the same time, and in the case of not defining the gaze-irrelevant features, implicitly remove the gaze-irrelevant features that are not related to gaze information in the above image features, and retain the gaze-related features that are related to gaze information in the above image features, thereby obtaining the gaze-related features.

Optionally, the above executive body uses the first auxiliary network and the second auxiliary network to execute two adversarial tasks respectively, which may include the following steps:

The first step is to use the first auxiliary network to perform a gaze prediction task (also known as the gaze prediction network), wherein the first auxiliary network determines the direction of gaze based on the image features extracted by the above feature extraction network. During the overall optimization of the network, the feature extraction network optimizes its own parameters so that the extracted image features contain gaze information that outnumbers a first predetermined threshold, such that the accuracy of the gaze direction determined by the first auxiliary network reaches a second predetermined threshold, thereby maximizing the gaze information contained in the above image features. Wherein, the first predetermined threshold may be 30, and the second predetermined threshold may be 90%.

Figure 4:
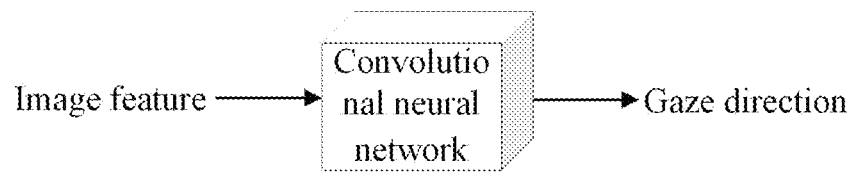
FIG. 4 is a schematic diagram of a process of the gaze prediction network according to some embodiments of the present disclosure.

The process diagram of the gaze prediction network is shown in FIG. 4. For the gaze prediction network, it tries to estimate the gaze direction of the target subject from the image features, and its loss function is defined as:

$$\mathcal{L}_{gaze} = \|g - \hat{g}\|_1.$$

Wherein, $\mathcal{L}_{gaze}$ represents the loss function of the gaze prediction network. g represents the real gaze direction of the sample target subject. $\hat{g}$ represents the real gaze direction. $\| \|_1$ represents the absolute value error (officially and generally referred to as the L1 loss function), which is obtained by summing the absolute value of each error.

The second step is to use the second auxiliary network to perform an adversarial image reconstruction task (also known as the image reconstruction network), wherein the second auxiliary network tries to recover the face or eye image from the above extracted image features, and the feature extraction network optimizes its own parameters, reduces the image information contained in the extracted image features, so that the second auxiliary network cannot recover the face or eye image from the above image features, thereby minimizing the image information contained in the above image features.

Figure 5:
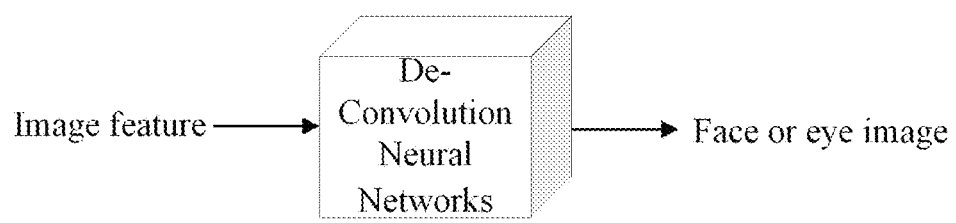
FIG. 5 is a schematic diagram of a process of the image reconstruction network according to some embodiments of the present disclosure.

The process diagram of the image reconstruction network is shown in FIG. 5. In the training phase, the image reconstruction network tries to reconstruct the face or eye image. Therefore, the loss function of the image reconstruction network is defined as:

$$\mathcal{L}_{rec} = \|I - \hat{I}\|_2.$$

Wherein, $\mathcal{L}_{rec}$ represents the loss function of the image reconstruction network. I represents the face or eye image. $\hat{I}$ represents the reconstructed image. $\| \|_2$ represents the least square error, which is obtained by summing the square of each error.

Optionally, by optimizing the two auxiliary network structures at the same time, and in the case of not defining the gaze-irrelevant features, the above executive body implicitly removes the gaze-irrelevant features that are not related to gaze information in the above image features, and retains the gaze-related features that are related to gaze information in the above image features, thereby obtaining the gaze-related features, wherein the following steps are included:

The first step is to use the second auxiliary network to reduce the image information contained in the image features, and the first auxiliary network to increase the gaze information contained in the image features.

The second step is to optimize the two auxiliary network structures so that the feature extraction network removes the gaze-irrelevant information contained in the extracted image features, and retains the gaze-related features that are related to the gaze information in the above image features to obtain the gaze-related features.

Figure 6:
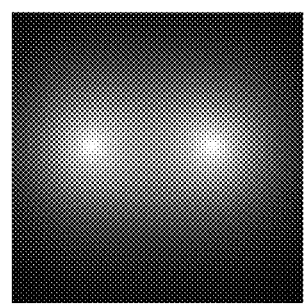
FIG. 6 is a weight diagram of the method for determining the direction of gaze according to some embodiments of the present disclosure.

Optionally, the above second auxiliary network is used to perform minimizing the image information task contained in the image features. The image information task includes setting a weight map for the second auxiliary network. The weight map is a weight map where different areas in the face or eye image of the above target subject have different weights. FIG. 6 shows a weight map centered on the human eye. By using this map in the image reconstruction network, the image reconstruction network can be limited to be more focused on removing the gaze-irrelevant features of the eye area. One way to use it is to modify the loss function of the feature extraction network as:

$$O\hat{\mathcal{L}}_{feature} = \alpha \times E[M \times (1-(I-\hat{I})^2)] + \beta \times \mathcal{L}_{gaze}.$$

Wherein, $\hat{\mathcal{L}}_{feature}$ represents the loss function of the modified feature extraction network. $\alpha$ represents the first hyperparameter. $E[\ ]$ means to find the expected value. M represents the set weight map. I represents the pixel value in the face or eye image. $\hat{I}$ represents the pixel value in the reconstructed image. $(\ )^2$ represents the squaring operation. $\beta$ represents the second hyperparameter. $\mathcal{L}_{gaze}$ represents the loss function of the gaze prediction network.

Even if an attention map is used to assign different weights to each pixel, the weights will affect the size of loss they result in.

Step 203: Determine the target gaze direction based on the above gaze-related features.

In some embodiments, the above executive body may determine the target gaze direction according to the above gaze-related features.

Figure 7:
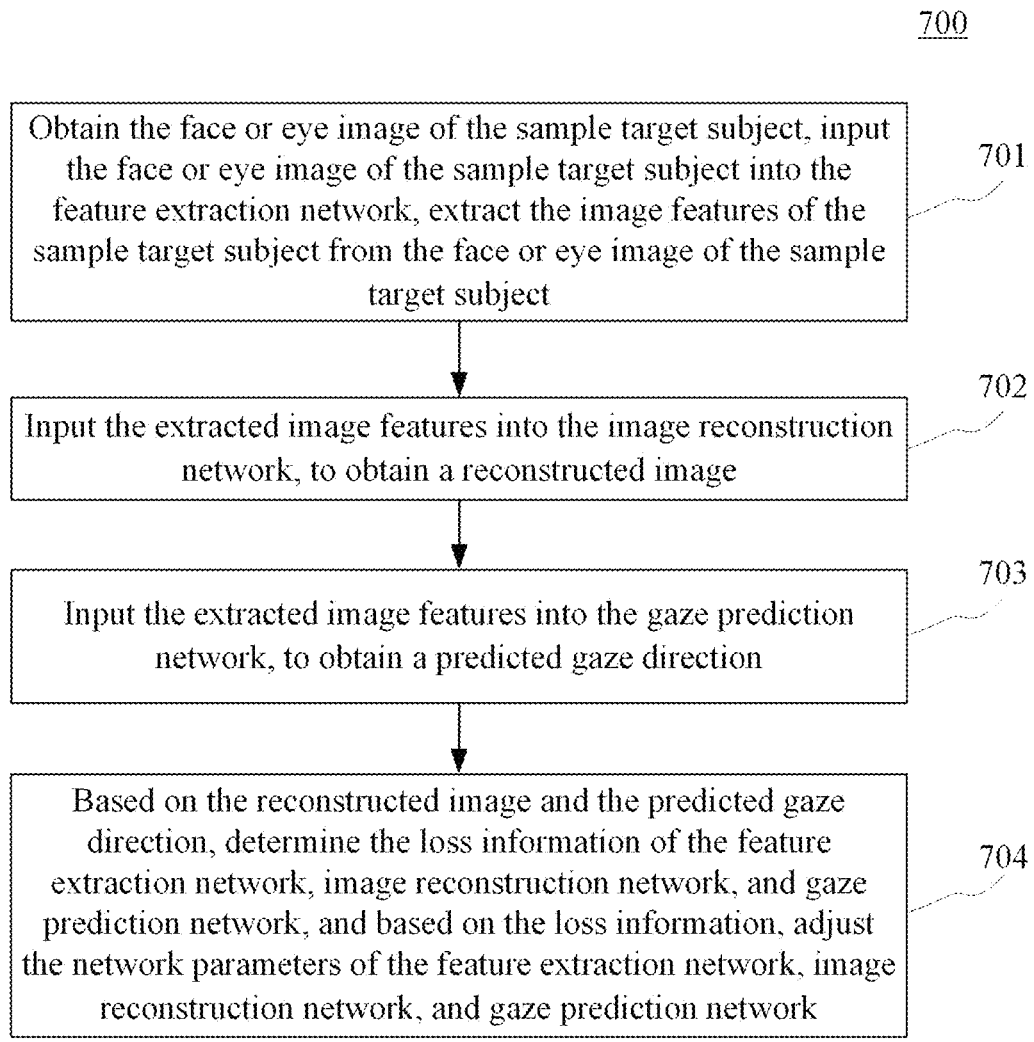
FIG. 7 is a flowchart of a neural network training method according to some embodiments of the present disclosure.

Further see FIG. 7, which is a flowchart of a neural network training method according to some embodiments of the present disclosure. The neural network training method collects the face or eye image of a sample target subject and inputs it into the feature extraction network to extract image features. The image features are input into the image reconstruction network and the gaze prediction network respectively, to obtain a reconstructed image and a predicted gaze direction. In the end, based on the obtained reconstructed image and the preset gaze direction respectively, the loss function of the feature extraction network, the loss function of the gaze prediction network, and the loss function of the image reconstruction network are substituted, to calculate the loss information of the feature extraction network, image reconstruction network, and gaze prediction network. And based on the loss information, adjust the parameter information of the feature extraction network, image reconstruction network, and gaze prediction network.

The above description is only some preferred embodiments of the present disclosure and an explanation of the applied technical principles. Those skilled in the art should understand that the scope of invention involved in the embodiments of the present disclosure is not limited to the technical solutions formed by the specific combination of the above technical features, but should also cover other technical solutions formed by any combination of the above technical features or their equivalent features in the case of not departing from the above-mentioned inventive concept, for example, technical solutions formed by replacing the above features with the technical features of similar functions disclosed in (but not limited to) the embodiments of the present disclosure.

What is claimed is:

1. A method for determining a direction of gaze, comprising:
    obtaining a face or eye image of a target subject, and establishing a feature extraction network, wherein the feature extraction network is used to extract image features of the target subject in the face or eye image;
    using an adversarial training method to optimize the feature extraction network, and removing gaze-irrelevant features extracted by the feature extraction network, so that the feature extraction network extracts gaze-related features from the face or eye image to obtain the gaze-related features; and
    determining a target gaze direction based on the gaze-related features,
    wherein the using an adversarial training method to optimize the feature extraction network, and removing the gaze-irrelevant features extracted by the feature extraction network, so that the feature extraction network extracts gaze-related features from the face or eye image to obtain the gaze-related features, includes:
    establishing two auxiliary network structures to obtain a first auxiliary network and a second auxiliary network, the first auxiliary network being an auxiliary network for predicting the direction of gaze from the image features, and the second auxiliary network being an auxiliary network for de-convolving the image features into the face or eye image, wherein the image features are input into the first auxiliary network to obtain a two-dimensional gaze direction vector, two dimensions representing a yaw angle of the gaze and a top-view angle of the gaze, respectively; and
    using the first auxiliary network and the second auxiliary network to perform two adversarial tasks, respectively, wherein the first auxiliary network maximizes gaze information contained in the image features extracted by the feature extraction network from the face or eye image of the target subject, and the second auxiliary network minimizes the image information contained in the image features extracted by the above feature extraction network from the face or eye image of the target subject.

2. The method of claim 1, wherein, the using an adversarial training method to optimize the feature extraction network, and removing the gaze-irrelevant features extracted by the feature extraction network, so that the feature extraction network extracts gaze-related features from the face or eye image to obtain the gaze-related features, further includes:
    by optimizing the two auxiliary network structures at the same time, and in the case of not defining the gaze-irrelevant features, removing the gaze-irrelevant features that are not related to gaze information in the image features, and retaining the gaze-related features that are related to gaze information in the image features, thereby obtaining the gaze-related features.

3. The method of claim 2, wherein, the using the first auxiliary network and the second auxiliary network to perform two adversarial tasks respectively includes:
    using the first auxiliary network to perform a gaze prediction task, wherein the first auxiliary network determines the direction of gaze based on the image features extracted by the feature extraction network, and during an overall optimization of the network, the feature extraction network optimizes its own parameters so that the extracted image features contain gaze information that has a number greater than a first predetermined threshold, such that an accuracy of the direction of gaze determined by the first auxiliary network reaches a second predetermined threshold, thereby maximizing the gaze information contained in the image features; and using the second auxiliary network to perform an adversarial image reconstruction task, wherein the second auxiliary network tries to recover the face or eye image from the extracted image features, and the feature extraction network optimizes its own parameters, reduces the image information contained in the extracted image features, so that the second auxiliary network cannot recover the face or eye image from the image features, thereby minimizing the image information contained in the image features.

4. The method of claim 3, wherein, the by optimizing the two auxiliary network structures at the same time, and in the case of not defining the gaze-irrelevant features, removing the gaze-irrelevant features that are not related to gaze information in the image features, and retaining the gaze-related features that are related to gaze information in the image features, thereby obtaining the gaze-related features, includes:

using the second auxiliary network to reduce the image information contained in the image features, and the first auxiliary network to increase the gaze information contained in the image features; and optimizing the two auxiliary network structures so that the feature extraction network removes the gaze-irrelevant information contained in the extracted image features, and retains the gaze-related features that are related to the gaze information in the image features to obtain the gaze-related features.

5. The method of claim 4, wherein, the second auxiliary network is used to perform minimizing an image information task contained in the image features, the image information task includes setting a weight map for the second auxiliary network, and the weight map is a weight map where different areas in the face or eye image of the target subject have different weights.

* * * * *